Patented July 25, 1939

2,166,955

UNITED STATES PATENT OFFICE 2,166,955

VINYL-TYPE RESINS

Arnold Kirkpatrick, Webster Groves, Mo., assignor to Monsanto Chemical Company, St. Louis, Mo., a corporation of Delaware No Drawing. Application August 1, 1936,
Serial No. 93,883

8 Claims. (Cl. 260—73)

This invention relates to synthetic vinyl-type resins, including particularly those consisting of polymerized vinyl acetals.

One of the objects of the invention is to improve the quality and especially the stability of such resins. A further object of the invention is to provide a convenient method of incorporating uniformly, small proportions of stabilizing and improving agents throughout the mass of the resinous material to be stabilized.

Some synthetic resins derived from vinyl esters are unstable to light and heat, whereas other resins derived from vinyl esters are stable to a remarkable degree. The resins produced by polymerization of substantially pure vinyl esters, for example, vinyl acetate, show much less tendency to objectionable changes on exposure to light and heat than those made, for example, by partial hydrolysis of polymerized vinyl acetate and subsequent condensation with formaldehyde or similar reagents that promote acetal formation.

The present invention is based upon the discovery that when a small proportion of an N-acyl-N-alkyl or aryl cyclohexylamine is added to a resin its stability is greatly improved. I have also found that of this class of stabilizing agents, the N-formyl-N-alkyl cyclohexylamines are especially desirable as agents for retarding the development of color in resins.

Compounds of this class, for example, N-formyl-N-butylcyclohexylamine can be prepared conveniently by alkylating cyclohexylamine, for example, with an alkyl halide, such as butyl chloride and acylating the resulting alkylcyclohexylamine. In the case of formyl compounds, acylation may be accomplished by means of formic acid, as more completely described hereinbelow.

Other stabilizing agents which may be used in place of N-formyl-N-n-butylcyclohexylamine are the N-formyl derivatives of N-ethyl-, N-benzyl-, and N-phenyl-cyclohexylamines. The corresponding N-acetyl derivatives of these same compounds are slightly less effective, since, although they exhibit a remarkable stabilizing effect, it is not possible to use them for stabilizing resins to temperatures as high as those for which the N-formyl derivatives are suited. The corresponding dicyclohexylamine derivatives are also effective as stabilizing agents; hence, it is to be understood that the expression N-alkylcyclohexylamine includes N-cyclohexyl-cyclohexylamine.

The proportions of the stabilizing agents which are added to the resin to protect it from discoloration by heat are small, considerably less than those proportions which would be required of the same agent to effect plasticization of the resin. Usually proportions of less than one part by weight to 100 parts of resin are satisfactory. It has been found that substantially larger proportions have, in some instances, a tendency to decrease the stabilizing effect; on the other hand, larger quantities function as plasticizers. Thus, in one case, 0.5% of stabilizing agent gave a greatly increased stability to one resin but the addition of 1% of the agent to the same resin produced a resin that was much more stable than the original but not as stable as that containing only 0.5%. The proportions of any particular stabilizing agent of the invention which are to be added to impart maximum stability to any particular resin are best determined by preliminary tests. Such tests are described hereinbelow.

To incorporate the stabilizing agent into the resin or compositions containing the resin,: numerous methods can be used. The stabilizing agents of the invention are soluble in and compatible with: alcohols, such as ethyl and methyl alcohol; esters, such as butyl acetate; ketones, such as acetone and diacetone alcohol; aliphatic and aromatic hydrocarbons, such as gasoline and benzene; drying oils, such as tung and linseed oil; chlorinated hydrocarbons, such as ethylene dichloride; and compatible with the resins herein indicated. The resin can be dissolved, if desired, in a mutual solvent for the resin and for the stabilizing agent and the resulting solution evaporated to recover the resin. If the resin is to be used in solution or dispersion, for example, in liquid coating compositions, the stabilizing agent can be added directly thereto and either dissolved or dispersed therein. A convenient method of incorporating the agent is to add it directly to the resin during preparation or while the resin is in a fluid condition. However, if the resin is in a hard or extremely viscous condition the difficulty of incorporating such small proportions of stabilizing agent is evident. The preferred method of the invention in this case consists in adding to the resin the stabilizing agent in solution in a volatile solvent, which solvent may be a solvent or non-solvent for the resin, and then mixing and subsequently volatilizing the solvent from the resin. A solvent for the stabilizing agent which is at the same time a non-solvent for the resin is preferred since it avoids a possibility of gelling the resin. Acetone is a satisfactory volatile solvent dilution medium for the stabilizing agents for use according to the procedure and its subsequent expulsion from the resin is easily accomplished by heating, the acetone being recoverable from the vapors, if desired. This method is especially well suited for incorporating the stabilizing agent into resins which are in fibrous form, that is, a form resembling cotton or cellulose acetate. In this case, the stabilizing agent is dissolved in a large proportion of a volatile solvent for the agent which is also a non-solvent for the resin and the resin is impregnated with the solution and subsequently heated to expel the solvent.

The resins for which the stabilizing agents of the invention are particularly applicable are those produced from partially hydrolyzed vinyl acetate polymers which have been condensed with formaldehyde (known under the trade-mark "Formvar") and similar resins made by condensation with acetaldehyde (known under the trade-mark "Alvar"). Such resins are commonly known as vinyl acetal polymers or resins. Other resins for which the stabilizing agents are adapted include those derived from ethylene oxide and polyvinyl alcohols, all of which substances yield transparent glass-like resins whose values are materially enhanced by increased stability to light and heat.

The examples which follow describe in greater detail the method of practicing the invention and some of the advantages accruing therefrom.

*Preparation of N-formyl-N-n-butylcyclohexylamine*

To 1300 kg. of cyclohexylamine maintained at or near the boiling point under a reflux condenser are added with stirring 200 kg. of normal-butyl chloride at approximately the rate at which it is taken up in the reaction. In general, this rate is fairly slow, though it may be increased or decreased in accordance with the degree of agitation or thoroughness of distribution of the butyl chloride in the mixture. Gentle refluxing and stirring are maintained for a period of about two and a half hours after the completion of the addition of the butyl chloride. The reaction mixture is then cooled until crystals begin to appear, at which point 200 kg. of a 50% by weight aqueous solution of sodium hydroxide diluted with approximately an equal volume of water are added with stirring to insure thorough distribution. The mixture is transferred to a suitable separating device or vessel provided with a bottom outlet, and allowed to separate into layers. The aqueous layer is drawn off and the residual oily layer is washed with a small quantity of dilute sodium hydroxide solution.

The N-n-butylcyclohexylamine is recovered by distillation, most of it appearing in the fraction boiling at about 80° C. at a pressure of 10 mm. (about 130° C. at 100 mm.).

The yields obtained by this process correspond to approximately 75% of the theoretical yield from the butyl chloride. Instead of this procedure, the butylation of cyclohexylamine can be effected in an autoclave under pressure or by other well-known methods.

The butylcyclohexylamine obtained above need not be further purified for the subsequent formylation. To 155.2 kg. of the compound thus prepared, maintained at a temperature of 60° C. under a reflux condenser, are slowly added, with stirring, 70 kg. of 85% formic acid (approximately 30% excess) at such a rate that the heat of the reaction is sufficient to maintain a gentle reflux. If desired, the acid can be added more rapidly if the mixture is stirred vigorously and cooled during the additions. After all the acid is added the reflux is maintained by outside heat for about two hours. The formylated product is distilled directly from the mixture, preferably directly without any cooling after the end of the reflux period so as to utilize the heat already present in the mixture.

The N-formyl-N-n-butylcyclohexylamine is a clear, colorless liquid with a boiling point of approximately 108°–118° at a pressure of 2 mm. (118°–123° at 10 mm.).

*Heat stability results*

Varying percentages of the stabilizing agent are incorporated with the resin to be stabilized by any suitable method. The samples thus prepared are placed in tubes and heated in an oil bath at a preselected temperature, generally somewhat higher than that to which it is desired to stabilize the resin. The discoloration of the samples is observed after various periods. By these observations it is possible to conclude which materials are effective, the optimum proportions to use and the period at that temperature for which the material can be stabilized.

Typical results of tests with the N-formyl-N-n-butylcyclohexylamine prepared in the example follow:

To weighted quantities of a commercial fibrous "Formvar" resin, much like cellulose acetate in appearance, contained in test tubes, were added weighted quantities of the N-formyl-N-n-butylcyclohexylamine dissolved in an amount of acetone sufficient for just wetting the resin and insufficient to cause appreciable gelation thereof. The resin was thoroughly mixed, the acetone was removed therefrom by slight warming or by means of vacuum or a current of air, and the tubes were then immersed in an oil bath maintained at 155° C. Four samples were tested—an unstabilized resin, a commercially "stabilized" resin, and two resins treated as above so that they contained 0.5% and 1%, respectively, of N-formyl-N-n-butylcyclohexylamine. After the resin samples were placed in the oil bath the temperature thereof was gradually raised during the course of an hour from 155° C. to 167° C.

The resins after the hour had the following appearance:

1. Unstabilized _____ Very dark
2. Stabilized by manufacturer _____ Light yellow
3. Sample 1 (unstabilized) with 0.5% formylbutylcyclohexylamine _____ No change
4. Sample 1 (unstabilized) with 1.0% formylbutylcyclohexylamine
   Discolored but lighter than 2

This test indicated that the formylbutylcyclohexylamine is better than the present stabilizing agent in commercial use and that the optimum proportion to use is 0.5% or less by weight of the resin.

Another test was made at a temperature of 160° C. for one hour followed by an additional period of heating for one-half hour at 175° C. The results were:

2. Stabilized by manufacturer __ Most darkening
3. Sample 1 (unstabilized with 0.5% formylbutylcyclohexylamine_ Least darkening
5. Sample 1 (unstabilized) with 0.125% formylbutylcyclohexylamine_ Slight darkening The above two series of tests establish the upper and lower limits of maximum effectiveness of the stabilizing agent and indicate that for optimum effectiveness at the temperatures of the tests approximately 0.5% of N-formyl-N-butyl-cyclohexylamine is to be used.

Although I have described representative embodiments of my invention and have shown that N-alkyl substituted cyclohexylamines which are acylated are valuable as stabilizing agents, and have set forth representative embodiments of the principles illustrating my invention, it is to be understood that the invention is not specifically limited to the exact compositions disclosed, but rather contemplates known equivalents of the compositions. To illustrate: I can use, instead of cyclohexylamine in producing my compounds, the corresponding C-alkyl cyclohexylamines. Cyclohexylamine is obtained by the hydrogenation of aniline. C-methyl cyclohexylamine is obtained in like manner by the hydrogenation of toluidine. The foregoing and other similar modifications are contemplated within the scope of the present invention as defined by the appended claims.

What I claim is:

1. A plastic composition embodying a polymerized vinyl acetal resin whose color is normally unstable to light and heat, containing uniformly distributed therein a stabilizing inhibitor of discoloration consisting of an N-acyl-N-alkyl-cyclohexylamine in a proportion not substantially greater than one part per hundred parts by weight of the resin.

2. A plastic composition embodying a polymerized vinyl acetal resin resulting from the condensation with formaldehyde of a partially hydrolyzed vinyl ester polymer, the color of which is normally unstable to light and heat, said resin containing uniformly distributed therein a stabilizing inhibitor of discoloration consisting of an N-acyl-N-alkyl-cyclohexylamine in a proportion not substantially greater than one part per hundred parts by weight of the resin.

3. A product as defined in claim 1 and further characterized in that the acyl is a formyl group.

4. A composition as defined in claim 2 and further characterized in that the acyl is a formyl group.

5. A composition as defined in claim 2 and further characterized in that the stabilizing agent is N-formyl-N-n-butylcyclohexylamine.

6. The method of stabilizing a composition embodying a vinyl acetal resin as its resin component, comprising uniformly incorporating with said composition an N-acyl-N-alkyl cyclohexylamine in a proportion not substantially greater than one part per hundred parts by weight of the resin.

7. A composition as defined in claim 1 and further characterized in that the stabilizing agent is N-formyl-N-n-butyl-cyclohexylamine.

8. A composition as defined in claim 1 and further characterized in that the stabilizing agent is N-formyl-N-ethyl-cyclohexylamine.

ARNOLD KIRKPATRICK.

---

CERTIFICATE OF CORRECTION.

Patent No. 2,166,955.  July 25, 1939.

ARNOLD KIRKPATRICK.

It is hereby certified that error appears in the printed specification of the above numbered patent requiring correction as follows: Page 2, second column, lines 30 and 33, for the word "weighted" read weighed; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.

optimum effectiveness at the temperatures of the tests approximately 0.5% of N-formyl-N-butyl-cyclohexylamine is to be used.

Although I have described representative embodiments of my invention and have shown that N-alkyl substituted cyclohexylamines which are acylated are valuable as stabilizing agents, and have set forth representative embodiments of the principles illustrating my invention, it is to be understood that the invention is not specifically limited to the exact compositions disclosed, but rather contemplates known equivalents of the compositions. To illustrate: I can use, instead of cyclohexylamine in producing my compounds, the corresponding C-alkyl cyclohexylamines. Cyclohexylamine is obtained by the hydrogenation of aniline. C-methyl cyclohexylamine is obtained in like manner by the hydrogenation of toluidine. The foregoing and other similar modifications are contemplated within the scope of the present invention as defined by the appended claims.

What I claim is:

1. A plastic composition embodying a polymerized vinyl acetal resin whose color is normally unstable to light and heat, containing uniformly distributed therein a stabilizing inhibitor of discoloration consisting of an N-acyl-N-alkyl-cyclohexylamine in a proportion not substantially greater than one part per hundred parts by weight of the resin.

2. A plastic composition embodying a polymerized vinyl acetal resin resulting from the condensation with formaldehyde of a partially hydrolyzed vinyl ester polymer, the color of which is normally unstable to light and heat, said resin containing uniformly distributed therein a stabilizing inhibitor of discoloration consisting of an N-acyl-N-alkyl-cyclohexylamine in a proportion not substantially greater than one part per hundred parts by weight of the resin.

3. A product as defined in claim 1 and further characterized in that the acyl is a formyl group.

4. A composition as defined in claim 2 and further characterized in that the acyl is a formyl group.

5. A composition as defined in claim 2 and further characterized in that the stabilizing agent is N-formyl-N-n-butylcyclohexylamine.

6. The method of stabilizing a composition embodying a vinyl acetal resin as its resin component, comprising uniformly incorporating with said composition an N-acyl-N-alkyl cyclohexylamine in a proportion not substantially greater than one part per hundred parts by weight of the resin.

7. A composition as defined in claim 1 and further characterized in that the stabilizing agent is N-formyl-N-n-butyl-cyclohexylamine.

8. A composition as defined in claim 1 and further characterized in that the stabilizing agent is N-formyl-N-ethyl-cyclohexylamine.

ARNOLD KIRKPATRICK.

---

CERTIFICATE OF CORRECTION.

Patent No. 2,166,955.　　　　　　　　July 25, 1939.

ARNOLD KIRKPATRICK.

It is hereby certified that error appears in the printed specification of the above numbered patent requiring correction as follows: Page 2, second column, lines 30 and 33, for the word "weighted" read weighed; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.